United States Patent
Laengert et al.

(10) Patent No.: US 8,429,466 B2
(45) Date of Patent: Apr. 23, 2013

(54) XML-SCHEMA-BASED AUTOMATED TEST PROCEDURE FOR ENTERPRISE SERVICE PAIRS

(75) Inventors: Rene Laengert, Massenbachhausen (DE); Michael Spengler, Forst (DE)

(73) Assignee: SAP AG, Walldorf (DE)

( * ) Notice: Subject to any disclaimer, the term of this patent is extended or adjusted under 35 U.S.C. 154(b) by 395 days.

(21) Appl. No.: 12/842,892

(22) Filed: Jul. 23, 2010

(65) Prior Publication Data

US 2012/0023371 A1    Jan. 26, 2012

(51) Int. Cl.
*G06F 11/00* (2006.01)

(52) U.S. Cl.
USPC .................. 714/49; 714/25; 714/32; 714/37; 714/38.1; 714/38.14

(58) Field of Classification Search .............. 714/25, 714/32, 37, 38.1, 38.14, 49
See application file for complete search history.

(56) References Cited

U.S. PATENT DOCUMENTS

| | | | | |
|---|---|---|---|---|
| 7,337,361 B2 * | 2/2008 | Leary et al. | ...................... | 714/25 |
| 7,454,660 B1 * | 11/2008 | Kolb et al. | ................. | 714/38.14 |
| 7,941,448 B2 * | 5/2011 | Eslambolchi et al. | ........ | 707/792 |
| 8,065,608 B2 * | 11/2011 | Raghavachari et al. | ...... | 715/237 |
| 2003/0074423 A1 * | 4/2003 | Mayberry et al. | ............ | 709/219 |
| 2004/0199818 A1 * | 10/2004 | Boilen et al. | ..................... | 714/25 |
| 2005/0228984 A1 * | 10/2005 | Edery et al. | ..................... | 713/153 |
| 2006/0150026 A1 * | 7/2006 | Kolawa et al. | .................. | 714/38 |
| 2006/0225048 A1 * | 10/2006 | Jakubiak | ....................... | 717/127 |
| 2006/0265475 A9 * | 11/2006 | Mayberry et al. | ............ | 709/219 |
| 2007/0067409 A1 * | 3/2007 | Eslambolchi et al. | ........ | 709/217 |
| 2010/0095276 A1 * | 4/2010 | Ottavi et al. | .................. | 717/125 |
| 2011/0138228 A1 * | 6/2011 | Takayama et al. | .............. | 714/32 |
| 2011/0264961 A1 * | 10/2011 | Hong | ........................... | 714/38.1 |
| 2012/0036219 A1 * | 2/2012 | Eslambolchi et al. | ........ | 709/217 |

* cited by examiner

*Primary Examiner* — Joshua P Lottich (57) ABSTRACT

The testing of services techniques include a method, a system, and a non-transitory computer-readable storage medium. In some embodiments of these techniques, the method includes receiving a first payload generated by a first service. The first service transmits the first payload to a system. The method further includes receiving a second payload from a second service. The second payload is generated based on data received from the first service. The method further includes receiving a schema associated with the second payload. The schema is configured to define the structure of the second payload. The method further includes determining one or more discrepancies between the second payload and the first payload using the schema associated with the second payload. The method further includes determining a testing result based on the one or more discrepancies.

This Abstract is provided for the sole purpose of complying with the Abstract requirement rules. This Abstract is submitted with the explicit understanding that it will not be used to interpret or to limit the scope or the meaning of the claims.

20 Claims, 11 Drawing Sheets

```
PAYLOAD1.XML - Notepad
File  Edit  Format  View  Help
<?xml version="1.0" encoding="utf-8"?>
<CustomerCreateRequest>
    <MessageHeader>
        <ID>Unique123</ID>
    </MessageHeader>
    <Customer>
        <MainData>
            <LastName>Miller</LastName>
            <FirstName>Peter</FirstName>
        </MainData>
        <CompanyData>
            <CompanyName>Company Inc.</CompanyName>
            <CompanyPhone>634897234</CompanyPhone>
        </CompanyData>
    </Customer>
</CustomerCreateRequest_sync>
```

XML-SCHEMA-BASED AUTOMATED TEST PROCEDURE FOR ENTERPRISE SERVICE PAIRS

FIELD OF THE INVENTION

The present invention relates generally to computer-based methods and systems for testing and verifying correctness of services and systems.

BACKGROUND

Business applications may be implemented by multiple services which process large volumes of data. For example, hundreds of services may create, update, delete, and read data associated with business objects. The services may handle similar business objects data in differently structured electronic documents. Moreover, the electronic documents containing the data may have hundreds or thousands of fields. As a result, testing of these various services becomes a difficult task. Thus, a need exists for a testing system that automatically and generically verifies correctness of the various services.

SUMMARY

One approach to testing services is a method. The method includes receiving a first payload generated by a first service. The first service transmits the first payload to a system. The method further includes receiving a second payload from a second service. The second payload is generated based on data received from the first service. The method further includes receiving a schema associated with the second payload. The schema is configured to define the structure of the second payload. The method further includes determining one or more discrepancies between the second payload and the first payload using the schema associated with the second payload. The method further includes determining a testing result based on the one or more discrepancies.

Another approach to testing services is a system. The system includes a service execution module configured to execute a first service. The first service is configured to generate a first payload, and transmit the first payload to a system. The service execution module is further configured to execute a second service. The second service is configured to receive a second payload based on data stored in the system. The system further includes a communication module configured to receive the first payload, the second payload, and a schema associated with the second payload. The system further includes a comparison management module configured to compare the second payload to the first payload using the schema.

Another approach to testing services is a non-transitory computer-readable storage medium. The non-transitory computer-readable storage medium comprises a set of processor executable instructions that when executed by a processor configure a computing apparatus to execute a first service. The first service is configured to generate a first XML payload and store the first XML payload in a system. The computing apparatus is further configured to receive the first XML payload from the first service. The computing apparatus is further configured to execute a second service. The second service is configured to request data from the system and receive a second XML payload based on the requested data. The computing apparatus is further configured to receive the second XML payload from the second service, and receive an XML schema associated with the second payload. The XML schema is configured to define the structure of the second XML payload. The computing apparatus is further configured to detect one or more discrepancies between the second XML payload and the first XML payload using the XML schema associated with the second XML payload. The computing apparatus is further configured to determine a testing result based on the one or more discrepancies. The first XML payload and the second XML payload may contain different structures.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration. The figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

Before turning to the figures which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Figure 1:
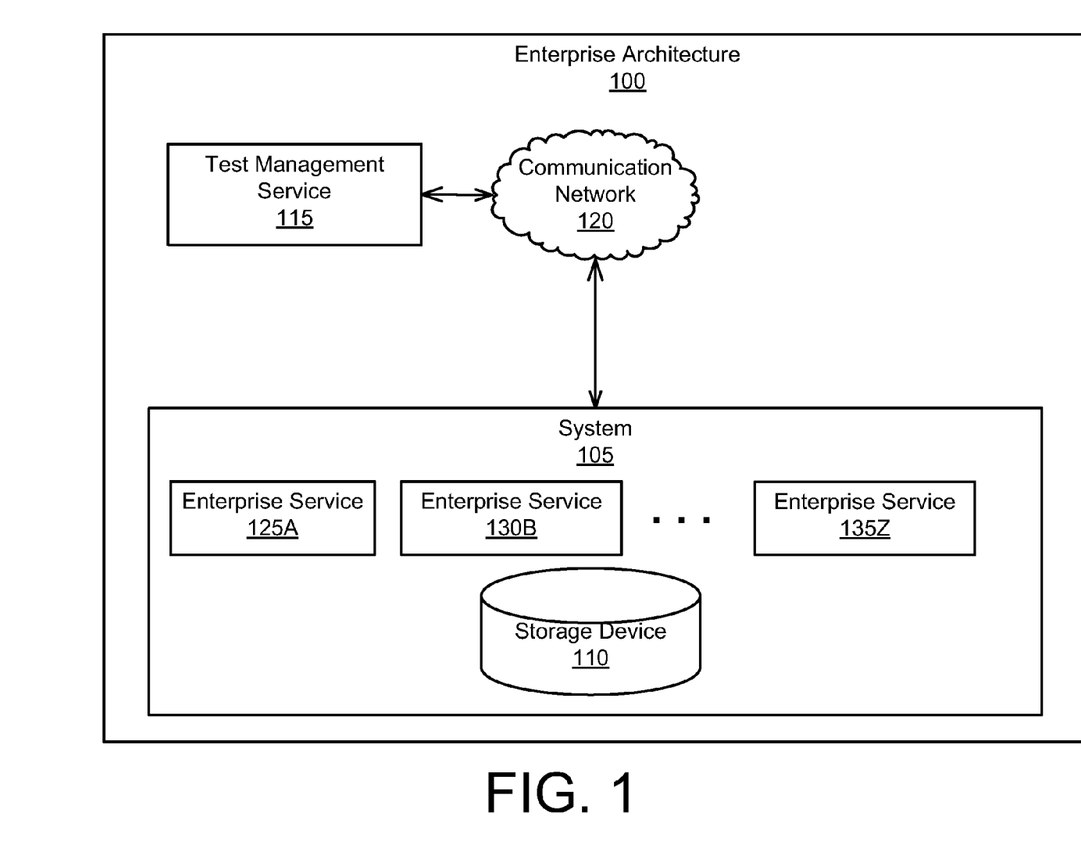
FIG. 1 is a block diagram illustrating an exemplary system, according to one exemplary embodiment.

FIG. 1 illustrates an exemplary enterprise architecture 100. The enterprise architecture 100 includes a system 105, a test management service 115, a communication network 120 (e.g., internet protocol (IP) network, and a local area network (LAN), internet, etc.).

The system 105 includes a storage device 110, and enterprise services 125A, 125B through 125Z. In some embodiments, the system 105 records and manages metadata, definitions and dependencies related to the enterprise services 125A, 125B through 125Z. For example, the system 105 is a central repository of information relating to the enterprise services 125A, 125B through 125Z. In some embodiments, the system 105 stores data processed by the enterprise services 125A, 125B through 125Z. For example, one or more of the enterprise services 125A, 125B through 125Z may transmit data to the system 105, which, in turn, may store the data in the storage device 110. In this example, one or more of the enterprise services 125A, 125B through 125Z may retrieve data stored in the storage device 110 for confirmation and/or further processing. In other embodiments, the system 105 may perform operations on the received and stored data. In other embodiments, the system 105 may notify one or more of the enterprise services 125A, 125B through 125Z or other services of arrival of data that may be of interest to those services. For example, the system 105 may be an enterprise resource planning system, a product lifecycle management system, a supply chain management system, a supplier relationship management system, a retail system, or any other system.

The enterprise services 125A, 125B through 125Z can process business objects or data (e.g., data regarding customers, products, orders, etc.). The enterprise services 125A, 125B through 125Z can perform specific tasks or functions (e.g., create/update/delete customers, create/update/delete purchase orders, etc.). The enterprise services 125A, 125B through 125Z may transmit and/or retrieve data from the system 105. In some embodiments, the enterprise services 125A, 125B through 125Z may store data in local data storage. In other embodiments, the enterprise services 125A, 125B through 125Z may store data of interest to other services in the system 105 or another central data repository. In some embodiments, an enterprise service may comprise one or more other services. The enterprise services 125A, 125B through 125Z may be web services, Windows services, Unix services, and/or any other type of service.

Although FIG. 1 illustrates a system 105, the enterprise architecture 100 can include any number of systems that store and/or process data used by the enterprise services 125A, 125B through 125Z. For example, the enterprise architecture 100 may include ten, one hundred, one thousand systems or more. In this example, the enterprise services 125A, 125B through 125Z may transmit and/or retrieve data from the such additional systems.

The test management service 115 manages testing and verification of the enterprise services 125A, 125B through 125Z. In some embodiments, the test management service 115 automatically verifies the enterprise services 125A, 125B through 125Z in a testing environment by executing the various services and comparing data produced, generated, and/or received by the services. In these embodiments, the test management service 115 can use schema corresponding to one or more payloads produced by one or more of the enterprise services 125A, 125B through 125Z. Using the schema to compare data produced by the enterprise services advantageously allows for automatic and generic testing of the enterprise services. In other embodiments, the test management service 115 may verify the correctness of the enterprise services 125A, 125B through 125Z in a live environment. The test management service 115 may detect discrepancies in the data produced by the enterprise services. These discrepancies may be caused by problems or bugs in one or more of the services. For example, an enterprise service may not be mapping all the fields correctly. In some embodiments, the discrepancies in data may be caused by a problem in the system 105.

In some embodiments, the test management service 115 compares payloads or data produced by a pair of enterprise services. In these embodiments, one of the enterprise services may generate a payload containing data regarding creating, updating, or deleting one or more business object. This enterprise service may transmit the payload to the system 105. In turn, the second enterprise service may request confirmation or read the data from the system. The data read from the system by the second enterprise service may be contained in a second payload. Using schema for the second payload, the test management service 115 may compare the two payloads to ensure correctness of the two services.

Although FIG. 1 illustrates a single communication network 120, the system can include a plurality of communication networks and/or the plurality of communication networks can be configured in a plurality of ways (e.g., a plurality of interconnected local area networks (LAN), a plurality of interconnected wide area networks (WAN), a plurality of interconnected LANs and/or WANs, etc.).

Although FIG. 1 illustrates a single system 105, the enterprise services 125A, 125B through 125Z, and the test management service 115, the enterprise architecture 100 can include any number of enterprise services, test management services, and/or data center systems.

Figure 2A:
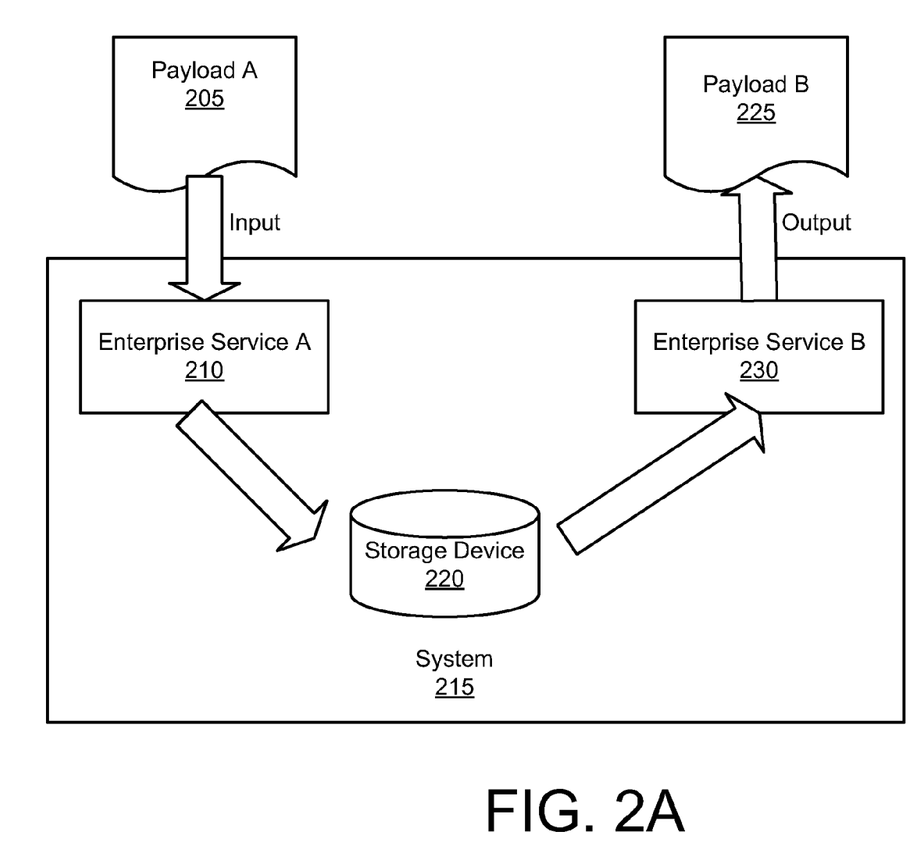
FIG. 2A-2C are block diagrams illustrating exemplary flow of data between exemplary services, according to one exemplary embodiment.

FIG. 2A illustrates an exemplary flow of data between a pair of services. An enterprise service A 210 receives payload A 205 as input. In some embodiments, the enterprise service A 210 may generate the payload A 205. In other embodiments, another service generates the payload A 205 and transmits it to the enterprise service A 210. The enterprise service A 210 may process payload A 205 (e.g., store in a local storage device, transmit messages to other services including payload A 205, etc.). As illustrated, the enterprise service A 210 sends payload A 205 to a system 215. The system 215 may store the payload A 205 in a storage device 220. The system 215 may transform and/or cleanse the data received from the enterprise service A 210.

An enterprise service B 230 is shown to retrieve payload B 225 from the system 215. In some embodiments, payload A 205 and payload B 225 share at least some common fields or data. Payload A 205 and payload B 225 may be in an Extensible Markup Language (XML) format. In these embodiments, the structure or definitions of the XML payload A 205 and XML payload B 225 may be identical. In other embodiments, the structure of the two XML payloads may differ. For example, payload A and payload B may share some common data and also contain additional data only found in one of the payloads. In another example, the common data may be stored in different tables. In other embodiments, payload A 205 and payload B 225 may be in any other format (e.g., binary format, and/or American Standard Code for Information Interchange (ASCII) format, etc.).

Figure 2B:
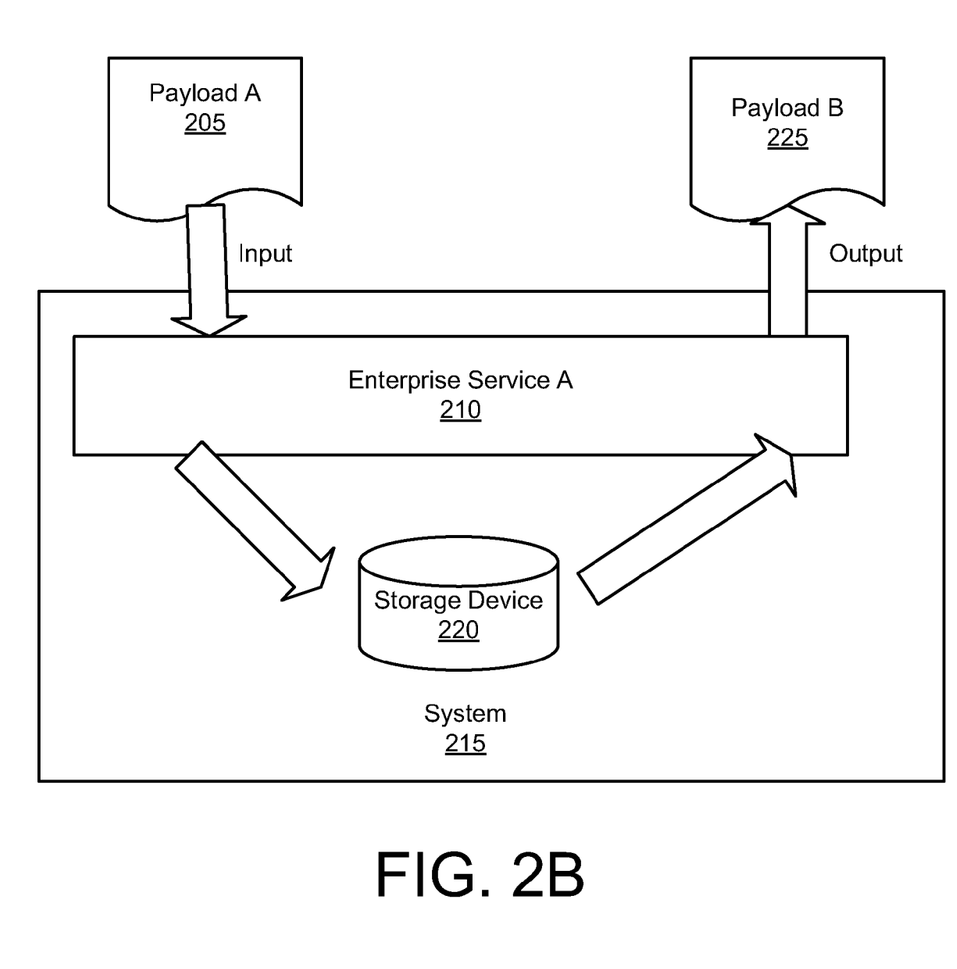
Figure 2C:
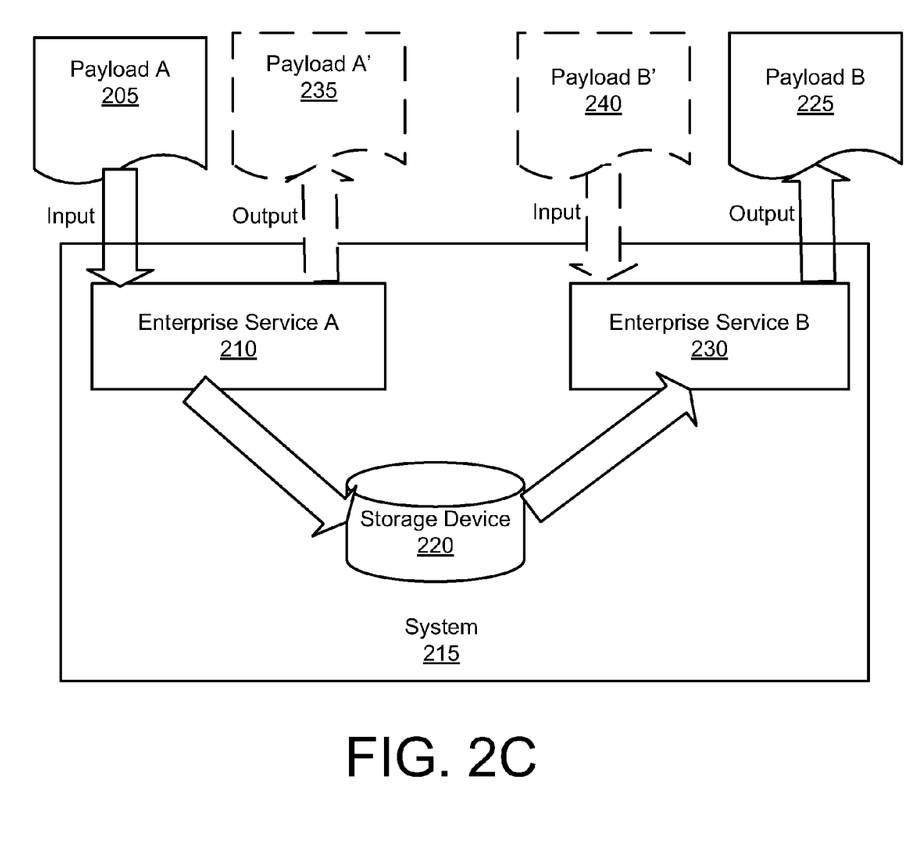

FIG. 2B illustrates a single enterprise service transmitting payload A to the storage device 200 and also retrieving payload B from the storage device 200. As shown, the enterprise service 210 stores payload A 205 (e.g., payload A containing "request" data) in the storage device 220, and then retrieves payload B 225 (e.g., "response/confirmation" data) from the storage device 220. As illustrated in FIG. 2C more than two payloads may be stored in the storage device 220. For example, payload A 205 and payload B' 240 may be stored in the storage device 220. Similarly, several payloads may be retrieved from the storage device (e.g., payload A' 235 and payload B 225). In some embodiments, regardless of the number of enterprise services or payloads involved, the test management service 115 compares two payloads at a time using the schema of the output payload.

Figure 3:
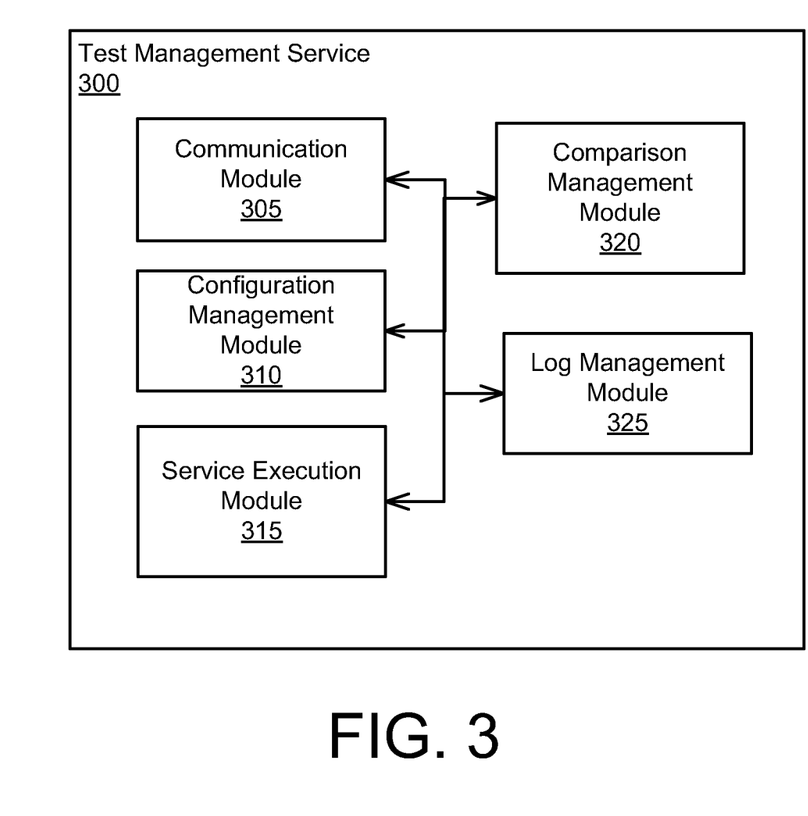
FIG. 3 is a block diagram illustrating an exemplary test management service, according to one exemplary embodiment.

FIG. 3 illustrates an exemplary test management service 300. The test management service 300 includes a communication module 305, a configuration management module 310, a comparison management module 315, and a log management module 320. The test management service 300 may run on a server, which in turn may include an output device, an input device, a processor, and/or a storage device. The modules and/or devices can be hardware and/or software. The modules and/or devices illustrated in the test management service 300 can, for example, utilize the processor to execute computer executable instructions and/or include a processor to execute computer executable instructions (e.g., an encryption processing unit, a field programmable gate array processing unit, etc.). It should be understood that the test management service 300 can include, for example, other modules, devices, and/or processors known in the art and/or varieties of the illustrated modules, devices, and/or processors. It should be understood that the modules and/or devices illustrated in the test management service 300 can be located within the test management service 300 and/or connected to the test management service 300 (e.g., directly, indirectly, etc.), but outside of the physical components of the management service 300 (e.g., personal computer, mobile device, etc.).

The communication module 305 communicates data to/from the test management service 300. The communication module 305 can include an interface for the test management service 300 used by other services to interact with the test management service 300.

The configuration management module 310 manages information regarding services being tested or scheduled for verification by the test management service 300. In some embodiments, the configuration management module 310 may automatically schedule services (e.g., enterprise services 125A, 125B through 125Z) for testing and data verification. In other embodiments, a software developer, a database administrator, or another user may configure the test management service 300. The configuration management module 310 may track historical testing information (e.g., store log files containing testing results). The configuration management module 310 may manage schemas associated with payloads produced by the various enterprise services being tested.

The service execution module 315 manages and/or controls execution of services (e.g., enterprise services 125A, 125B through 125Z) to facilitate testing of these services.

The comparison management module 320 manages and/or performs comparison of data generated or used by the enterprise services (e.g., enterprise service A 210 and enterprise service B 230). In some embodiments, the comparison management module 320 can compare data processed by pairs of services. The comparison management module 320 may analyze the comparison results to determine which service or services cause the discrepancies in data. For example, the comparison management module 320 may compare payload A 205 to payload B 225 and determine whether any discrepancies exist that indicate a problem with the enterprise service A and/or enterprise service B. In some embodiments, although the structure or definition of the two payloads A 205 and B 225 may be different, the comparison management module 320 determines whether all or some data in the two payloads matches. In some embodiments, the comparison management module 320 utilizes a schema describing the structure of one or both of the payloads. As a result, the comparison management module 320 advantageously determines discrepancies in relevant data despite differences in structure and differences in what data the two payloads contain, and/or order of business objects stored in payloads.

The log management module 325 manages tracking and/or logging comparison results. In some embodiments, the log management module 325 maintains one or more log files or electronic log documents that contain data comparison results. The log management module 325 may log identification information regarding services being tested along with comparison results. In some embodiments, the log management module 325 logs successful comparisons including identification information for the services being compared. In some embodiments, the log management module 325 logs warning information indicating that there might be a potential problem with one or more of the services being tested. In some embodiments, the log management module 325 logs error information indicating that there is a problem or bug in one or more of the services being tested. The error information may include service identifying information, information regarding data that did not match (e.g., field in the payload B 225 that did not match corresponding fields in the payload A 205), and/or an indication of what service(s) was most likely to cause the discrepancy.

The output device may output information and/or data associated with the test management service 300 (e.g., information to a printer (not shown), etc.). The input device may receive information associated with the test management service 300 (e.g., instructions from a user, instructions from a computing device, etc.) from a user (not shown) and/or a computing system (not shown). The input device can include, for example, a keyboard, a scanner, etc.

The processor executes the operating system and/or any other computer executable instructions for the management service (e.g., executes applications, etc.). The test management service 300 can include random access memory (not shown). The random access memory can temporarily store the operating system, the instructions, and/or any other data associated with the management service. The random access memory can include one or more levels of memory storage (e.g., processor register, storage disk cache, main memory, etc.).

The storage device may store files (e.g., log files storing comparison results), testing configuration, an operating system and/or any other data or program code associated with the test management service 300. The storage device can include a plurality of storage devices. The storage device can include, for example, long-term storage (e.g., a hard drive, a tape storage device, flash memory, etc.), short-term storage (e.g., a random access memory, a graphics memory, etc.), and/or any other type of computer readable storage.

Although FIG. 3 illustrates the exemplary test management service 300, any of the services described herein (e.g., enterprise services) can include the components and functionality described with respect to the test management service 300. In some embodiments, the test management service 300 may be implemented by one or more services (e.g., web services) and may utilize one or more servers and/or one or more processors.

Figure 4:
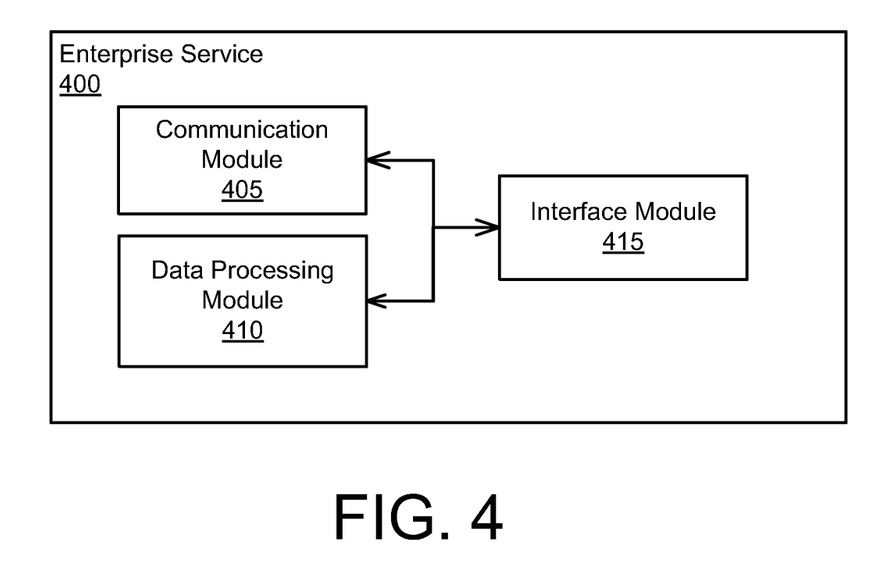
FIG. 4 is a block diagram illustrating an exemplary enterprise service, according to one exemplary embodiment.

FIG. 4 illustrates an exemplary enterprise service 400. The enterprise service 400 includes a communication module 405, and a data processing module 410, an interface module 415. The enterprise service 400 may run on a server (or multiple servers), which in turn may include an output device, an input device, a processor, and/or a storage device. The modules and/or devices can be hardware and/or software. The modules and/or devices illustrated in the enterprise service 400 can, for example, utilize the processor to execute computer executable instructions and/or include a processor to execute computer executable instructions (e.g., an encryption processing unit, a field programmable gate array processing unit, etc.). It should be understood that the enterprise service 400 can include, for example, other modules, devices, and/or processors known in the art and/or varieties of the illustrated modules, devices, and/or processors. It should be understood that the modules and/or devices illustrated in the enterprise service 400 can be located within the enterprise service 400 and/or connected to the enterprise service 400 (e.g., directly, indirectly, etc.), but outside of the physical components of the enterprise service 400 (e.g., personal computer, mobile device, etc.).

The communication module 405 communicates data to/from the enterprise service 400. The data processing module 410 manages processing of data. The interface module 415 can include interface information associated with the enterprise service 400 that is used by other services to interact with the enterprise service 400.

The output device may output information and/or data associated with the enterprise service 400 (e.g., information to a printer (not shown), information to a speaker, etc.). The input device may receive information associated with the enterprise service 400 (e.g., instructions from a user, instructions from a computing device, etc.) from a user (not shown) and/or a computing system (not shown). The input device can include, for example, a keyboard, a scanner, etc.

The processor executes the operating system and/or any other computer executable instructions for the management service (e.g., executes applications, etc.). The enterprise service 400 can include random access memory (not shown). The random access memory can temporarily store the operating system, the instructions, and/or any other data associated with the management service. The random access memory can include one or more levels of memory storage (e.g., processor register, storage disk cache, main memory, etc.).

The storage device may store files (e.g., log files storing comparison results), testing configuration, an operating system and/or any other data or program code associated with the enterprise service 400. The storage device can include a plurality of storage devices. The storage device can include, for example, long-term storage (e.g., a hard drive, a tape storage device, flash memory, etc.), short-term storage (e.g., a random access memory, a graphics memory, etc.), and/or any other type of computer readable storage.

In some embodiments, the enterprise service 400 may be implemented by one or more services and may utilize one or more servers and processors. The enterprise service 400 may support a particular business process. In some embodiments, the enterprise service 400 is implemented by software, and utilizes computer hardware (e.g., processor) to execute the software.

Figure 5:
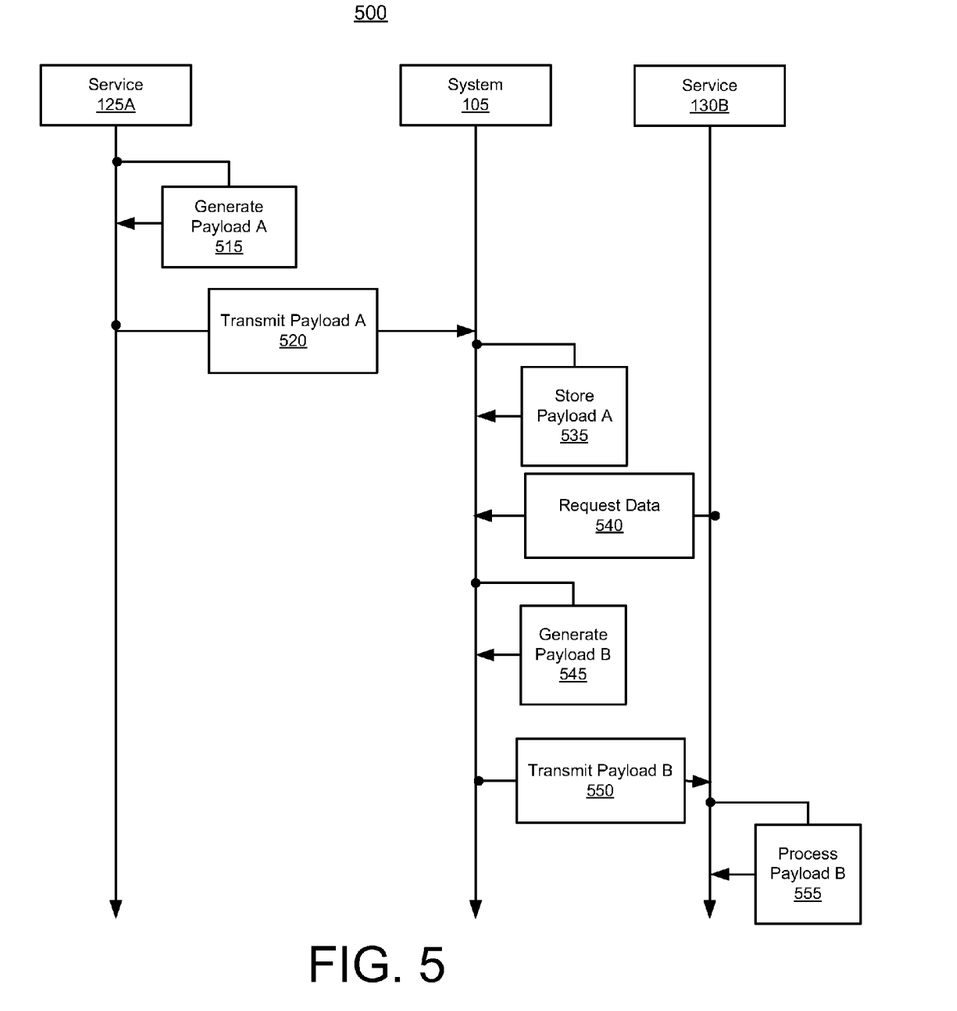
FIG. 5 illustrates a flow chart of the exemplary flow of data between exemplary services.

In FIG. 5, a flow chart 500 relating to transfer of data between a service 125A, a service 130B and a system 105 is shown, according to an exemplary embodiment. The data processing module 125 of service 125A generates (step 515) payload A. In some embodiments, the payload A is received by the communication module 405. In some embodiments, the payload A is stored in a local storage device of service 125A. In other embodiments, the data processing module 410 transforms the data contained in the payload A before transmitting the payload A to the system 105.

At step 520, the communication module 405 of service 125A transmits the payload A to the system 105. The system 105 stores (step 535) the received payload A in its local storage. In other embodiments, system 105 may store the payload A in another system or service. At step 540, system 105 receives a request for data from the service 130B. In some embodiments, the request data may relate to data stored in the payload A. In response, the system 105 generates (step 545) a payload B, and transmits (step 550) the generated payload B back to the service 130B. In other embodiments, the payload B is generated by the service 130B based on the data received from the system 105. For example, the service 125A may send payload A to the system 105 containing data regarding creation of a new customer. In this example, the service 130B may request confirmation that the new customer was created.

Figure 6:
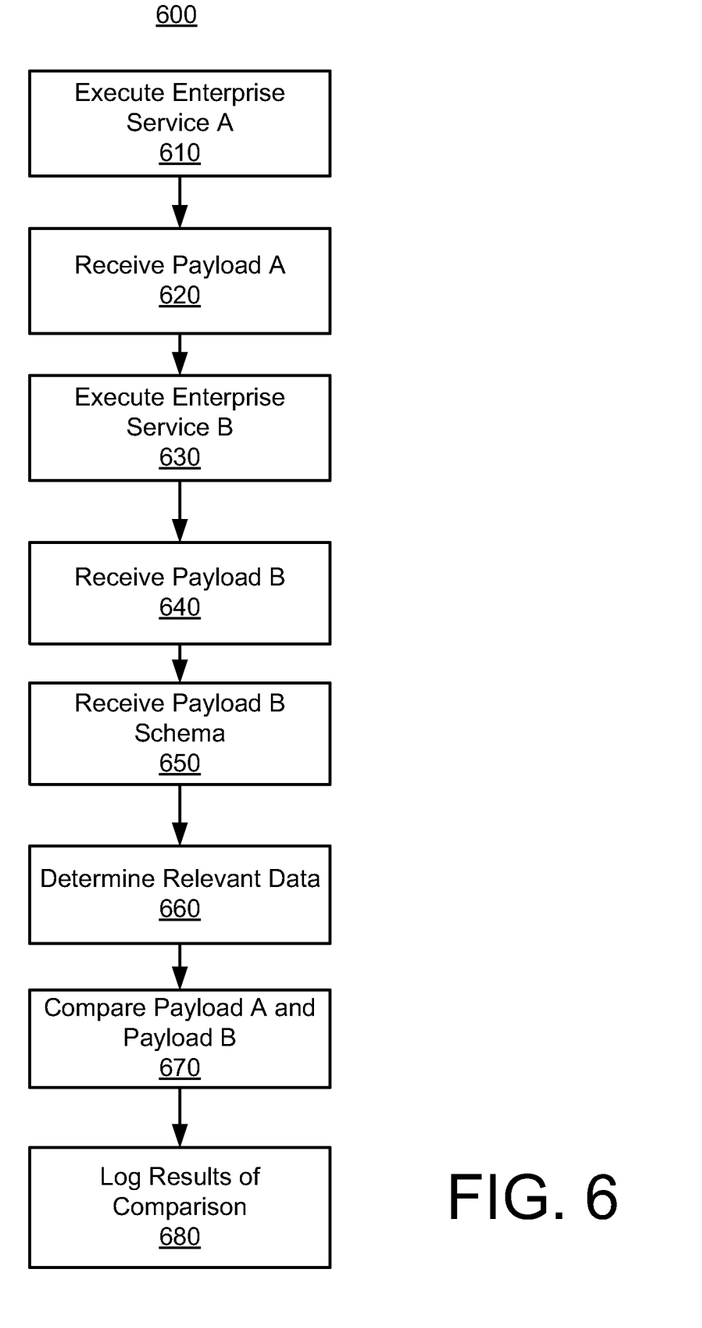
FIG. 6 illustrates a flow chart showing payload comparison.

The service 130B may further process (step 555) payload B. For example, the service 130B may store payload B in a local storage device (e.g., storage device 475). In another example, the service 130B may transform payload B (e.g., perform data mapping) into another data format. During processing of the payload B, the service 130B may use some or all the data contained in the payload B. In other embodiments, service 130B may send the payload B to other enterprise services for further processing. All or some of the data contained in payload B may match data that is contained in payload A. FIG. 6 illustrates a process of comparing payloads A and B to ensure correctness of the service 125A and the service 130B.

FIG. 6 illustrates an exemplary process of testing whether a pair of services is functioning properly. To test that two enterprise services are working correctly, the service execution module 315 executes (step 610) enterprise service A (e.g., service 125A) and enterprise service B (e.g., service 130B) (step 630). In some embodiments, the service A may create, update, and/or delete various business objects (e.g., customer, order, invoice, etc.). In these embodiments, the service B may request a confirmation or read data associated with the create, update, or delete operation performed by the service A.

As a result of executing services A and B, the service execution module 315 receives payload A (step 620) and payload B (step 640). In other embodiments, the communication module 305 may receive payloads A and B. In some embodiments, the communication module 305 (or the service execution module 315) may request payloads A and B from the services A and B. At step 650, the communication module 305 receives a schema associated with the payload B. In some embodiments, payload A and B are in XML format, and the received schema associated with the payload B is an XML schema defining structure of the payload B. The payload B schema may be stored by the service B and/or by the test management service 300.

At step 660, the comparison management module 320 determines relevant data for the comparison. In some embodiments, the comparison management module 320 only tests most important or relevant fields as defined in one or more configuration documents. In these embodiments, the information regarding the fields that are considered important for testing may be stored in the storage device 375 and/or storage device 475. For example, the configuration document(s) may contain relevant portions of the schema for the comparison. In other embodiments, the comparison management module 320 compares all the fields present in payload B to the fields in payload A. In other embodiments, the comparison management module 320 may compare all overlapping fields in the two payloads. In other embodiments, the comparison management module 320 considers data as relevant if it is present in the payload A and is also in the schema of payload B.

Using the two payloads, schema for payload B and/or the relevant fields for comparison, the comparison management module 320 compares (step 670) payload B to payload A. The schema of payload B enables the comparison management module 320 to perform the verification process efficiently and generically even when the structure of the two payloads is different and/or the sequence of business objects stored in the payloads varies.

The two payloads may contain hundreds of fields, including deeply nested structures and multiple tables (e.g., multiple business partners or customers, with multiple addresses). In some embodiments, the comparison management module 320 may ignore differences in structure of payload A and payload B to determine whether the relevant data matches or are different if they are supposed to be different. The relevant data in the payload B may be found in a different location or tables of the payload A. The comparison management module 320 may compare every line of a table in the payload A with every line of a table in payload B. The comparison management module 320 may produce a result indicating which lines of the table in the payloads A and B have the highest number of equal values. If the number of equal values drops below a predefined threshold (e.g., 50%), then the comparison management module 320 may determine that a corresponding line in the payload B was not found. In some embodiments, a table in a payload may correspond to a node (e.g., XML node) containing multiple elements and/or sub-nodes. For example, a table may correspond to an XML node having one or more attributes, one or more elements, and/or one or more sub-nodes.

In some embodiments, the payload A may contain control structures which indicate whether the sub-nodes are to be created, updated, or deleted. The payload B may contain header information and/or log information. In some embodiments, only the relevant business object data of the payload B are verified against the payload A. If the relevant data in the payload B is present in the payload A, then the values of those fields must match, for the services A and B to be operating correctly.

For example, the service A may update an order, and send the payload A containing information regarding the updated order to the system. In turn, the system may store the received payload A. In this example, the service B may request confirmation of the updated order and receive the payload B from the system. Although the payload B may differ in structure from the payload A, at least some of the data related to the update of the order may match. The relevant data in the payloads A and B not matching provides an indication that the services A and/or B are not functioning properly (e.g., not mapping all the fields properly, fields are empty, lines of sub-tables could not be correlated or found, etc.). Based on the comparison results, the comparison management module 320 may determine whether the services A and/or B are in error.

At step 680, the log management module 325 logs the comparison results. In some embodiments, the log management module 325 manages one or more logs (e.g., log file) containing information regarding performed testing of enterprise services. The logs may store information regarding testing results including whether particular services are in error, potentially in error, and/or working correctly. The logs may store information about the location (e.g., XML path) of an error, successful check, and/or potential error. The logs may provide information regarding specific table lines in payload A that have been determined to have corresponding lines in payload B (i.e., as determined by the comparison management module 320). In some embodiments, the logs only store exceptions or errors incurred during testing of service pairs. In some embodiments, the log management module 325 may send alerts to a predetermined list of users indicating results of the service verification process.

Figure 7A:
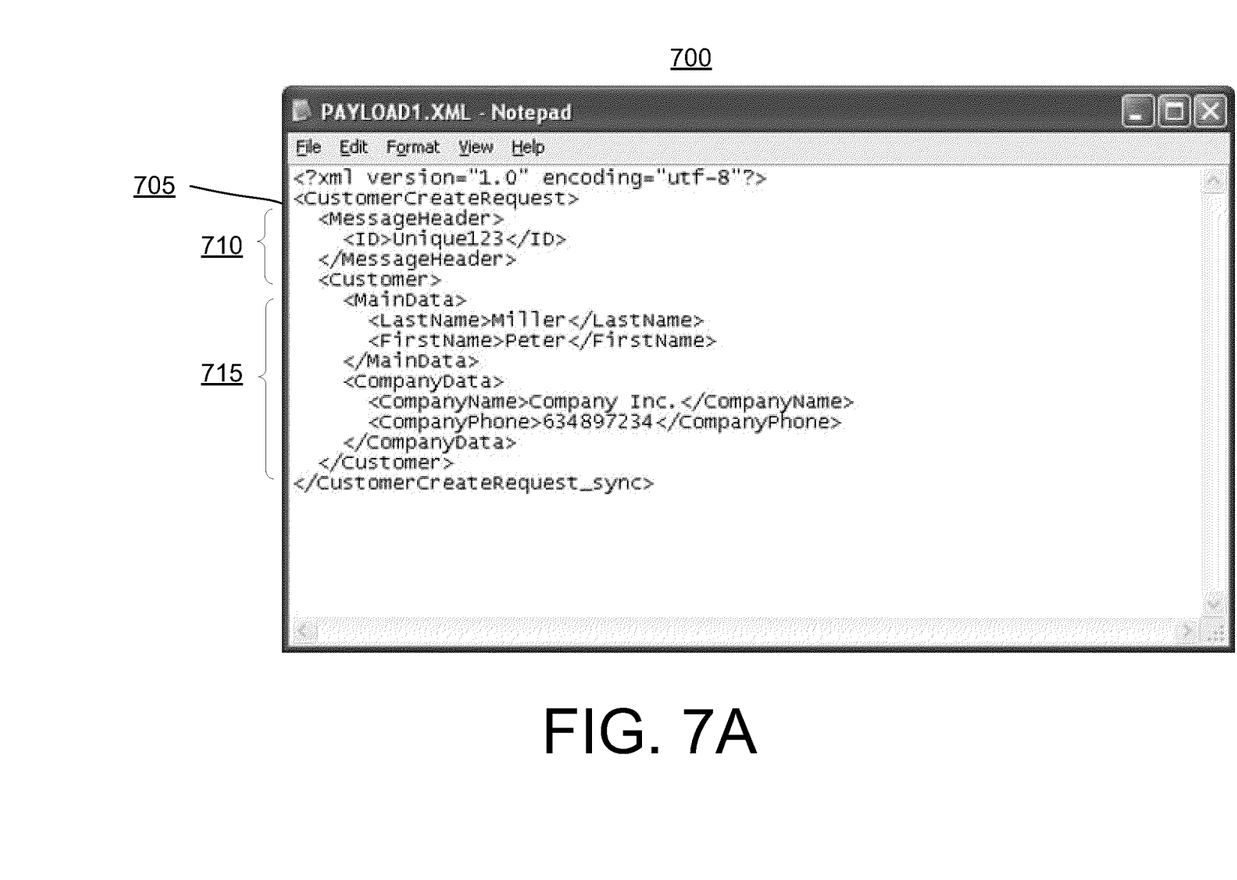
FIGS. 7A-7C illustrate exemplary payloads and an exemplary schema according to one exemplary embodiment.
Figure 7B:
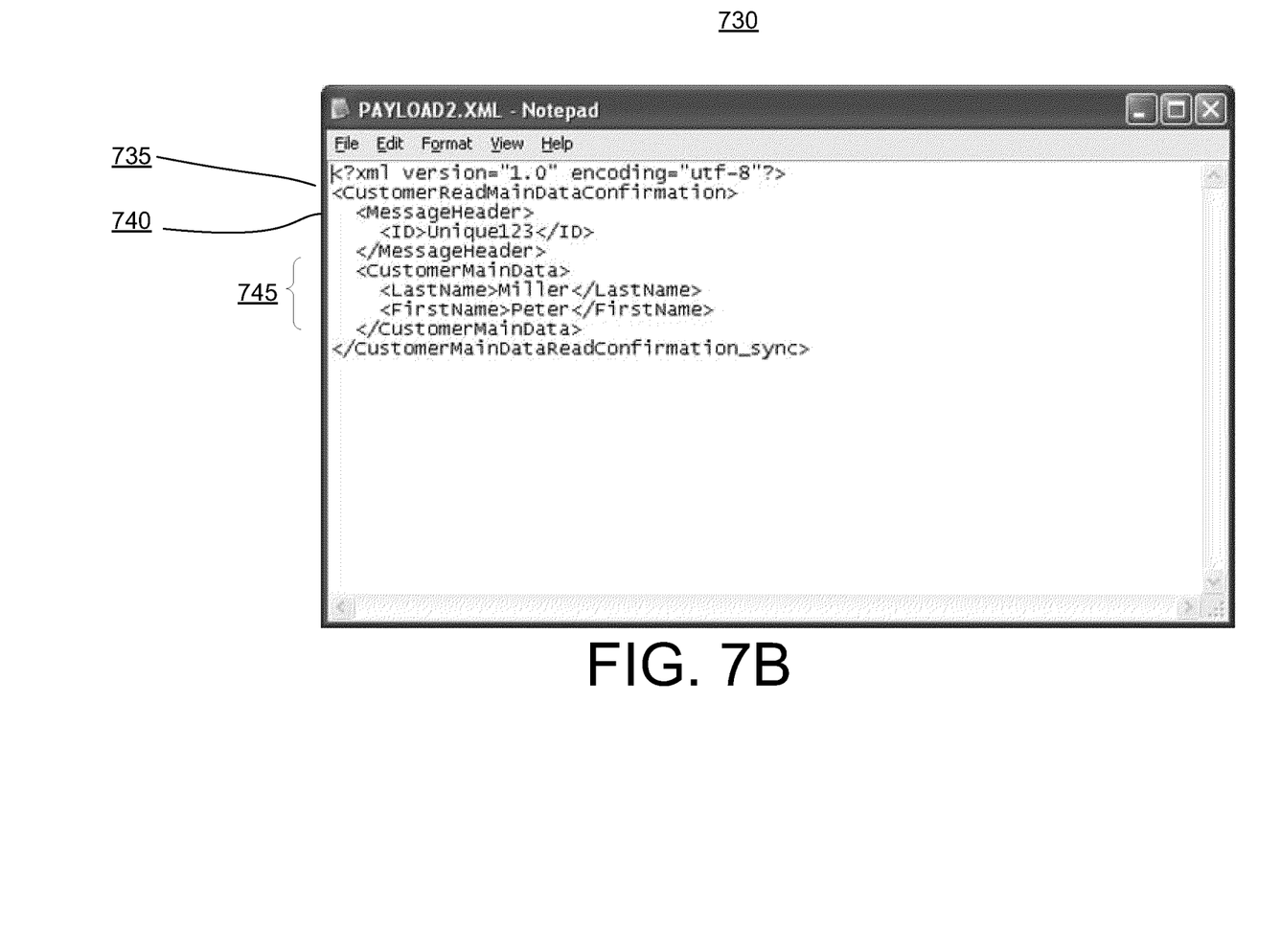

In FIGS. 7A and 7B, two payloads 700 and 730 are shown, according to an exemplary embodiment. Although the payloads 700 and 730 are shown in an XML format, the payloads can contain data in any other format. The payload 700 is shown to include a "CustomerCreateRequest" node 705 containing "MessageHeader" node 710 and "Customer" node 715. As illustrated, the "Customer" node 715 contains "MainData" and "CompanyData" nodes, which in turn contain first name, last name, company name, and company phone elements. In FIG. 7B, the payload 730 is shown to include a somewhat different structure than the payload 700. The payload 730 is shown to include a "CustomerReadMainDataConfirmation" node 735 that contains "MessageHeader" node 740 and "CustomerMainData" node 745.

Figure 7C:
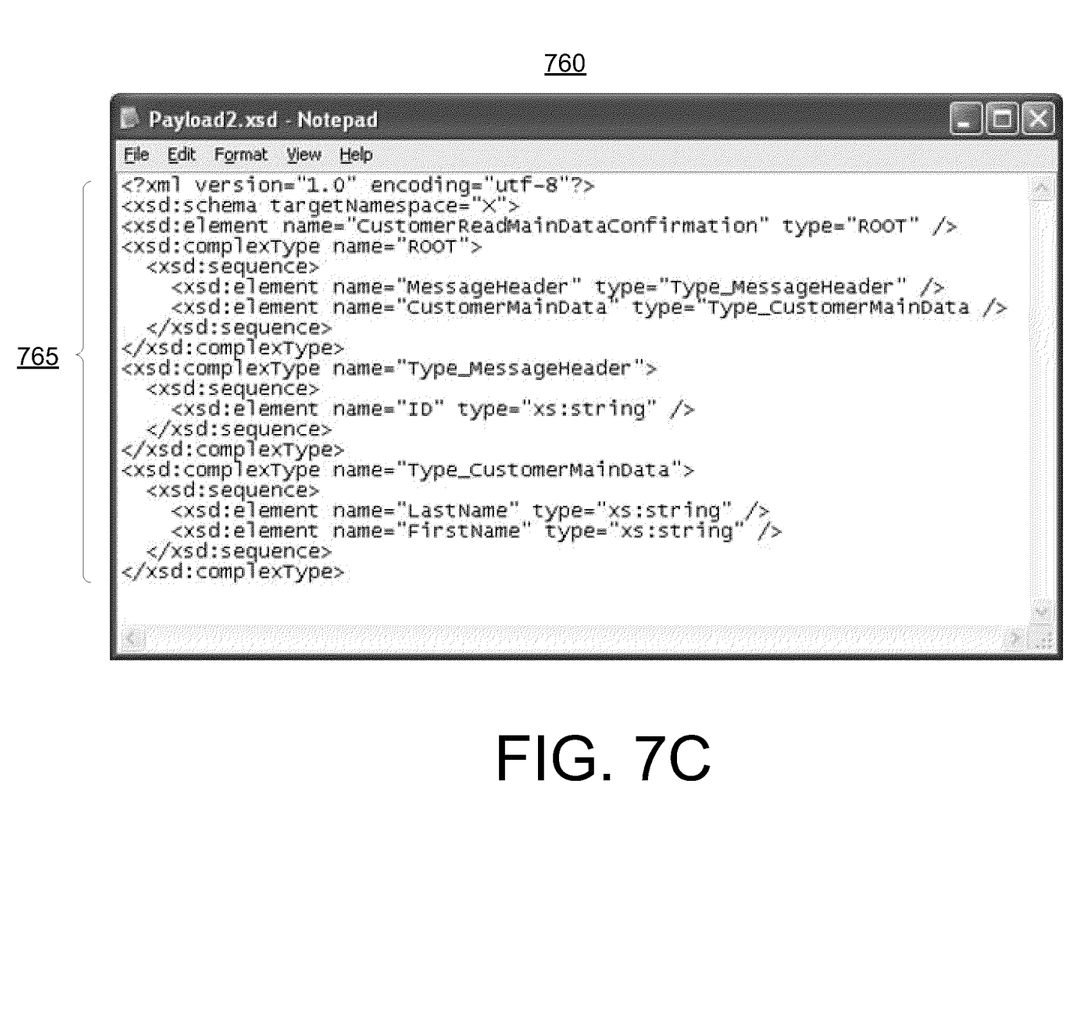

In FIG. 7C, an exemplary XML schema 760 is shown, according to an exemplary embodiment. The XML schema 760 defines the structure of the payload B 730. In some embodiments, the XML schema 760 is stored in a separate document from the payload B 730. Using the XML schema 760 and the payloads 700 and 730, the comparison management logic 320 may detect discrepancies between the values of elements in the payload 700 and the payload 730. These discrepancies may indicate a potential problem with the services generating and/or using the two payloads.

Although not shown in FIGS. 7A-7B, the two payloads may contain many tables (e.g., hundreds) with numerous elements. Although the structure of the two payloads may differ, they may have some similarities in data. The comparison management module 320 detects discrepancies between the relevant data of the two payloads, regardless of the payloads' structure.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user via a keyboard or a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a computer-readable storage medium. Computer-readable storage media can be non- transitory in nature and can include both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for testing services, the method comprising:
receiving a first payload generated by a first service, wherein the first service transmits the first payload to a system;
receiving a second payload from a second service, the second payload generated based on data received from the first service;
receiving a schema associated with the second payload, the schema configured to define the structure of the second payload;
determining one or more discrepancies between the second payload and the first payload using the schema associated with the second payload; and
determining a testing result based on the one or more discrepancies.

2. The method of claim 1, wherein the system stores the first payload in a storage device.

3. The method of claim 1, further comprising logging the testing result into a log.

4. The method of claim 1, wherein the first payload, the second payload, and the schema are in XML format.

5. The method of claim 1, wherein the first payload and the second payload have different structures.

6. The method of claim 1, wherein a first subset of data included in the second payload is compared to a second subset of data in the first payload, wherein the first subset of data and the second subset of data contain different structures.

7. The method of claim 1, further comprising:
executing the first service, wherein the first service generates the first payload, and
executing the second service, wherein the system generates the second payload based on data stored in the system.

8. The method of claim 1, wherein the first service includes one or more web services.

9. The method of claim 1, wherein the second service includes one or more web services.

10. A system for testing services, including instructions stored on a non-transitory computer readable storage medium and executable by at least one processor, the system comprising:
a service execution module configured to cause the at least one processor to:
execute a first service, the first service configured to generate a first payload, and transmit the first payload to a system,
execute a second service, the second service configured to receive a second payload based on data stored in the system;
a communication module configured to cause the at least one processor to:
receive the first payload, the second payload, and a schema associated with the second payload; and
a comparison management module configured to cause the at least one processor to compare the second payload to the first payload using the schema.

11. The system of claim 10, wherein the first service transmits the first payload to the system, and the second service retrieves the second payload from the system.

12. The system of claim 10, further comprising a log management module configured to cause the at least one processor to log comparison results into a log.

13. The system of claim 10, wherein the first payload, the second payload and the schema are in XML format.

14. The system of claim 10, wherein the first payload and the second payload have different structures.

15. The system of claim 10, wherein a subset of data included in the second payload is compared to the first payload.

16. The system of claim 10, wherein the first service includes one or more web services.

17. The system of claim 10, wherein the second service includes one or more web services.

18. A non-transitory computer-readable storage medium, the non-transitory computer-readable storage medium comprising a set of processor executable instructions that when executed by a processor configure a computing apparatus to:
execute a first service, the first service generating a first XML payload and storing the first XML payload in a system;
receive the first XML payload from the first service;
execute a second service, the second service requesting data from the system and receiving a second XML payload based on the requested data;
receive the second XML payload from the second service;
receive an XML schema associated with the second payload, the XML schema configured to define the structure of the second XML payload;
detect one or more discrepancies between the second XML payload and the first XML payload using the XML schema associated with the second XML payload;
determine a testing result based on the one or more discrepancies; and
wherein the first XML payload and the second XML payload contain different structures.

19. The non-transitory computer-readable storage medium of claim 18, wherein the testing result indicates a problem with the first service.

20. The non-transitory computer-readable storage medium of claim 18, wherein the testing result indicates a problem with the second service.

* * * * *